(12) United States Patent
Hogervorst et al.

(10) Patent No.: US 11,253,893 B2
(45) Date of Patent: Feb. 22, 2022

(54) SUCTION UNIT FOR A ROBOTIC SORTER

(71) Applicant: Bollegraaf Patents and Brands B.V., Appingedam (NL)

(72) Inventors: Wouter Hendrik Hogervorst, Appingedam (NL); Johannes Sijbrand Vogelaar, Appingedam (NL)

(73) Assignee: Bollegraaf Patents and Brands B.V., Appingedam (NL)

(*) Notice: Subject to any disclaimer, the term of this patent is extended or adjusted under 35 U.S.C. 154(b) by 82 days.

(21) Appl. No.: 16/720,022

(22) Filed: Dec. 19, 2019

(65) Prior Publication Data
US 2020/0206783 A1     Jul. 2, 2020

(30) Foreign Application Priority Data
Dec. 28, 2018 (NL) .................................. 2022319

(51) Int. Cl.
*B07C 5/36* (2006.01)
*B07C 5/342* (2006.01)

(52) U.S. Cl.
CPC ............ *B07C 5/368* (2013.01); *B07C 5/3422* (2013.01)

(58) Field of Classification Search
CPC .............................. B07C 5/368; B07C 5/3422
USPC ........................................................ 209/643
See application file for complete search history.

(56) References Cited

U.S. PATENT DOCUMENTS

| | | | | |
|---|---|---|---|---|
| 6,106,040 A | * | 8/2000 | Focke | ...................... B65B 35/18 53/473 |
| 10,016,790 B1 | * | 7/2018 | Travis | ................... B07C 5/3422 |
| 2010/0300041 A1 | * | 12/2010 | Kim | ....................... G07F 11/165 53/281 |
| 2012/0107184 A1 | * | 5/2012 | Asiyanbola | ............... A61L 2/18 422/119 |
| 2014/0142745 A1 | * | 5/2014 | Johnston | .................... B07C 5/36 700/223 |
| 2021/0061588 A1 | * | 3/2021 | Lukka | ..................... B07C 5/368 |

FOREIGN PATENT DOCUMENTS

| | | | | |
|---|---|---|---|---|
| CN | 201789739 U | 4/2011 | | |
| CN | 207361325 U | 5/2018 | | |
| CN | 108298155 A | 7/2018 | | |
| WO | 98/19799 A1 | 5/1998 | | |
| WO | WO-9819799 A1 | * | 5/1998 | ............. B07C 5/368 |
| WO | 03/061858 A1 | 7/2003 | | |
| WO | 2017/158120 A1 | 9/2017 | | |

\* cited by examiner

*Primary Examiner* — Terrell H Matthews
(74) *Attorney, Agent, or Firm* — N.V. Nederlandsch Octrooibureau; Katelyn J. Bernier; Catherine A. Shultz

(57) ABSTRACT

An item sorting system (1) includes a moving belt (1*a*) and one or more sorting units (2). The sorting unit (2) has an enclosure (3) with a work aperture (4), a suction unit (5) with a suction head (6), and a robot arm unit (7) mounted in the enclosure (3) for moving the suction head (6) within a predetermined operating space within the enclosure (3). The enclosure (3) has one or more shell sections (3*a*) forming a side wall (3*b*) of the enclosure (3). In a further aspect, the suction unit (5) has a suction head (6) connected to a suction head channel (11), a low pressure source (12*a*) connected to the suction head channel (11) via a first valve (13), and a control unit (15) connected to the first valve (13) and arranged to actuate the first valve (13) between a suction position and a release position.

16 Claims, 3 Drawing Sheets

SUCTION UNIT FOR A ROBOTIC SORTER

FIELD OF THE INVENTION

The present invention relates to a sorting unit for an item sorting system, and in a further aspect to a suction unit for use in such a sorting unit. Furthermore, the present invention relates to an item sorting system.

BACKGROUND ART

Prior art waste (item) handling and sorting systems utilize a conveyor belt for transporting waste items from one location to another, and may use a vision system and a (suction based) picking unit to separate certain types of items from others on the conveyor belt.

International patent publication WO03/61858 discloses a method and apparatus for identifying and sorting objects or items, such as (plastic) waste, wherein a flow of objects is transported by a conveyor belt.

International patent publication WO98/19799 discloses a method and apparatus for classifying materials to be extracted from a stream of items on a moving belt. A computer tracks registered objects as they are conveyed on the moving belt and directs automated devices including mechanical means such as air jets, robotic arms, or other mechanical diverters to extract the registered objects.

SUMMARY OF THE INVENTION

The present invention seeks to provide an improved item sorting system, allowing to sort items such as (plastic, paper, wood, steel, stone etc.) waste objects in a faster and more efficient manner.

According to the present invention, a sorting unit as defined above is provided, comprising an enclosure having a work aperture, a suction unit mounted in the enclosure and having a suction head, and a robot arm unit mounted in the enclosure for moving the suction head within a predetermined operating space within the enclosure, wherein the enclosure comprises one or more shell sections, the one or more shell sections forming a side wall of the enclosure. The construction of components of the sorting unit allow easy transport and installation, are less heavy than prior art units, and allow a robust and reliable operation of the sorting unit.

In a further aspect, the present invention relates to a suction unit for use in a sorting unit according to any one of the present invention embodiments, wherein the suction unit comprises a suction head connected to a suction head channel, a low pressure source connected to the suction head channel via a first valve, the first valve comprising an intake port, and a control unit connected to the first valve, and arranged to actuate the first valve between a suction position and a release position. This suction unit can operate in a very efficient manner, especially when picking up plastic items from a moving belt.

Furthermore, the present invention relates to an item sorting system, comprising a moving belt and one or more sorting units according to any one of the present invention sorting unit embodiments, at least one of the one or more sorting units comprising a suction unit according to any one of the present invention suction unit embodiments.

SHORT DESCRIPTION OF DRAWINGS

The present invention will be discussed in more detail below, with reference to the attached drawings, in which FIG. 1 shows a perspective view of an item sorting system according to an embodiment of the present invention;

DESCRIPTION OF EMBODIMENTS

In waste separation systems, or in more general term, an item sorting system, items are placed on a moving belt, and selected items are taken off and put in separated bins for later re-use or recycling purposes. More and more, this is implemented using robotic technologies, which e.g. allows to use a system continuously.

Figure 1:
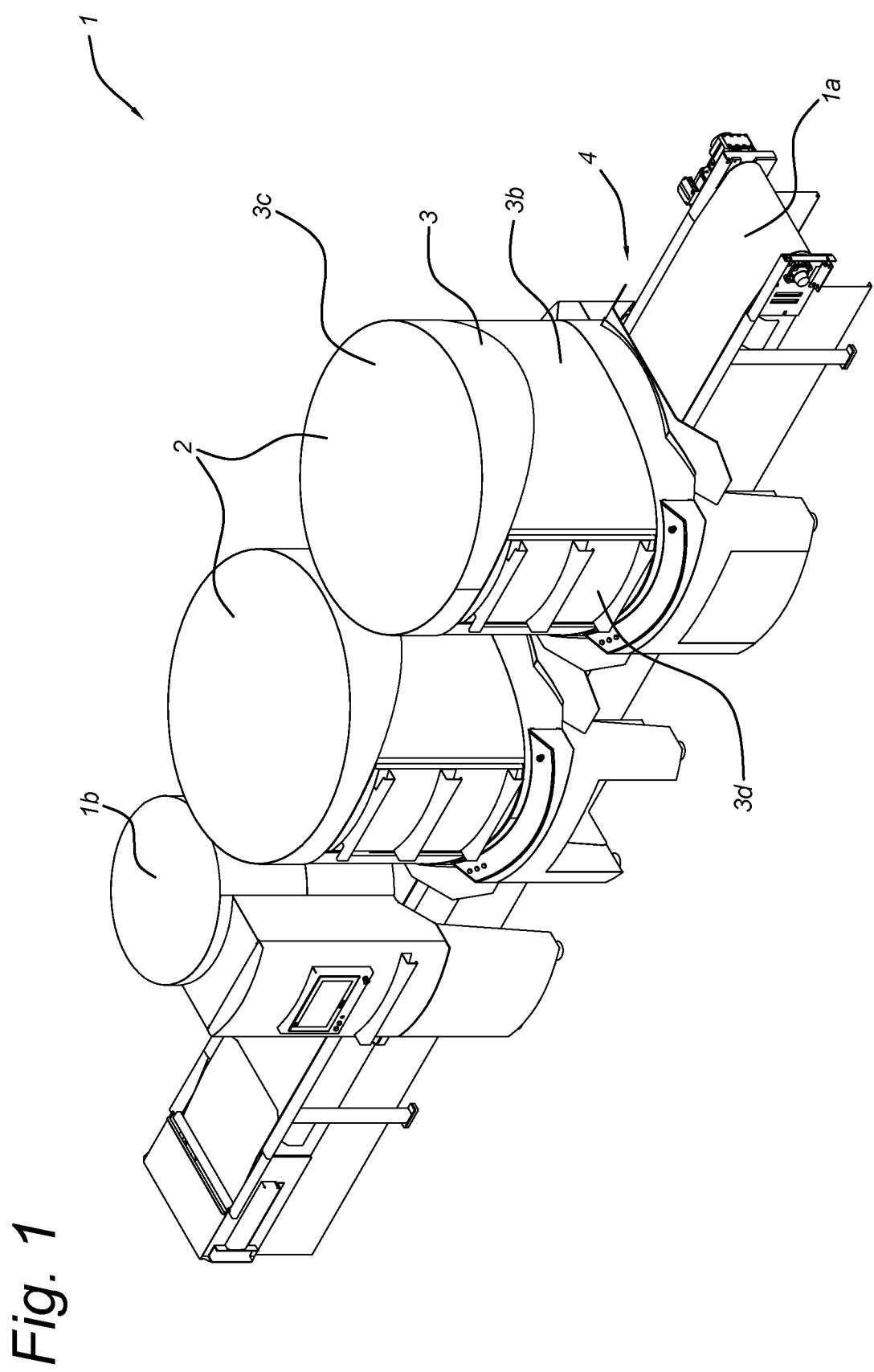

FIG. 1 shows a perspective view of an item sorting system 1 according to an exemplary embodiment of the present invention. The perspective view shows the moving belt a, and a number of units 1b, 2 positioned over the moving belt 1a. At the upstream position of the moving belt 1a, a vision unit 1b is positioned, allowing to take images from the items on the moving belt 1a during operation, and performing image processing to determine the presence and position of various classes of items, such as (plastic and/or paper) waste items (bottles, bottle parts, plastic foils, etc.). The downstream sorting units 2 can then be controlled to pick up specific items which could possibly be re-used or recycled. This can be done by selecting and picking out items intended for re-use or recycling, or by selecting and picking out items not intended for re-use or recycling (leaving the items for re-use or recycling on the moving belt 1a).

Figure 4:
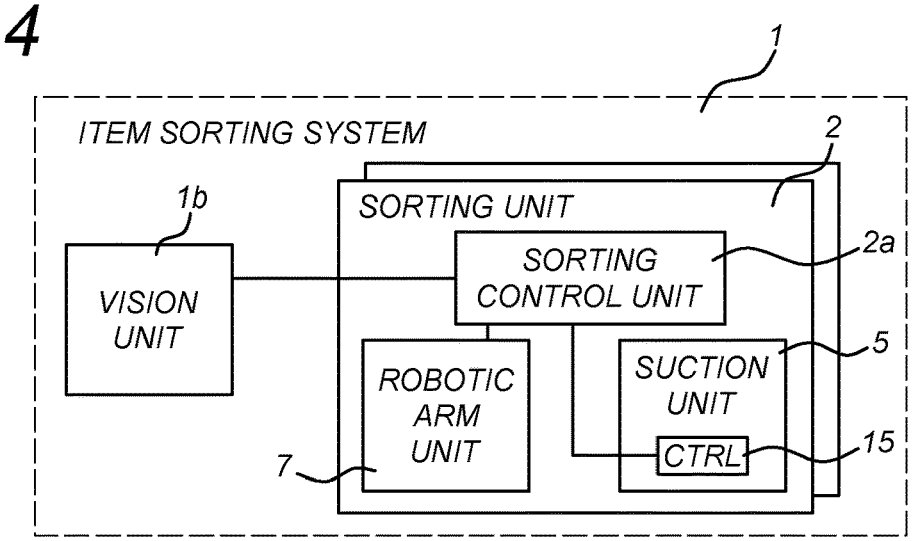
FIG. 4 shows a block diagram of the item sorting system according to an even further embodiment of the present invention.

FIG. 4 shows a block diagram of the item sorting system 1, showing the components of the above exemplary embodiment from a different view point. As described above, the item sorting system 1 comprises a moving belt 1a and one or more sorting units 2 according to any of the present invention embodiments, as described in further detail below. At least one of the one or more sorting units 2 comprises a suction unit (5) according to any one of the present invention embodiments, described in further detail below.

As shown in the block diagram of FIG. 4, the sorting unit 2 comprises a robotic arm unit 7 and a suction unit 5 (which includes a control unit 15 for controlling the pneumatic parts of the suction unit 5, see details as described below). The item sorting system may further comprise a vision unit 1b for providing sorting image data associated with items (such as (plastic) waste parts) on the moving belt 1a during operation. The one or more sorting units 2 each comprise a sorting control unit 2a connected to the robot arm unit 7 and the control unit 15 of the associated suction unit 5, the sorting control unit 2a being connected to the vision unit 1b for receiving the sorting image data. This allows to operate the item sorting system in a highly automated, efficient manner, thus being able to obtain an increased speed and volume of e.g. waste being separated for recycling purposes.

Figure 2:
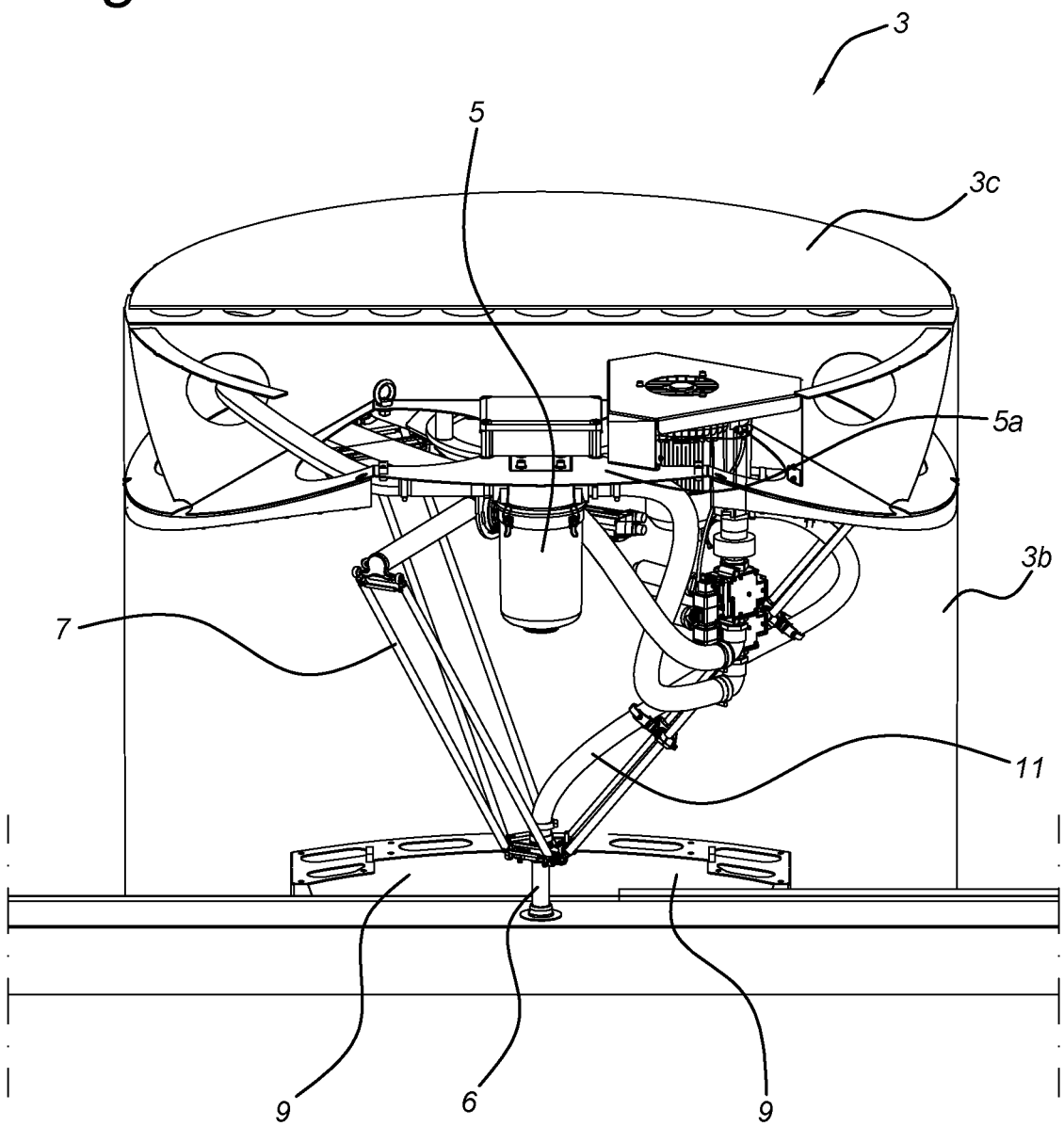
FIG. 2 shows a cross sectional and perspective view of an embodiment of a sorting unit as used in the item sorting system shown in FIG. 1.

FIG. 2 shows a cross sectional and perspective view of a sorting unit 2 as used in the item sorting system shown in FIG. 1. In a generic embodiment, this sorting unit 2 for a (robotic) item sorting system 1 comprises an enclosure 3 having a work aperture 4 (i.e. a bottom part, which in operation allows the sorting unit 2 to be positioned above the moving belt 1a. A suction unit 5 is mounted in the enclosure 3 and has a suction head 6. A robot arm unit 7 is provided which is mounted in the enclosure 3 for moving the suction head 6 within a predetermined operating space within the enclosure 3. In accordance with one aspect of the present invention, the enclosure 3 comprises one or more shell sections 3a, the one or more shell sections 3a forming a side wall 3b of the enclosure 3. The side wall 3b is e.g. a tube like, or cylindrical, wall, which inherently adds to structural integrity and stiffness of the enclosure 3 (in combination with a top side 3c), and hence of sorting unit 2. The one or more shell sections 3a are made from plastic material allowing to make the enclosure 3 in a cost-effective manner, and using a simple and efficient construction, yet allowing easy transport of the one or more shell sections 3a. The one or more shell sections 3a are e.g. made from a (partially) transparent material, e.g. polycarbonate. To further enhance structural integrity of the enclosure 3, the one or more shell sections 3a can be made of a reinforced polycarbonate material, or polymethylmethacrylate material.

In a further embodiment, the suction unit 5 comprises a suction unit mounting structure 5a directly attached to the enclosure (3). This is shown in the cross sectional view of FIG. 2, where the suction unit mounting structure 5a connects the components of the suction unit 5 to the tubular/cylindrical side wall 3b. The advantage is that no separate frame is needed, e.g. for the robot arm unit 7, which usually require a sturdy frame to cater for the often high acceleration forces encountered during operation of the robot arm unit 7. In addition, weight saving is obtained for the sorting unit 2, which is also relevant for installation of the sorting unit 2 at the location of an item sorting system 1. Moreover, as the robot arm unit 7 only has to move around the suction head 6, the weight to be moved is low, allowing higher accelerations and movements by the robot arm unit 7 compared to prior art systems.

The sorting unit 2 further comprises a down-flow unit 8 positioned at a top side 3c of the enclosure 3. Such a down-flow unit 8 is arranged to control flow of air in (and around) the enclosure 3 of the sorting unit 2. This down-flow unit 8 allows to create an over pressure in the enclosure 3, and thus provides the advantage of controlling presence of dirt and/or small particles during operation in the sorting unit 2, resulting in less down time for cleaning and preventing unscheduled maintenance.

In the exemplary embodiments shown in the perspective view of FIG. 1, the sorting unit 2 further comprising an access part 3d (e.g. in the form of a door in an opening) in the side wall 3b of the enclosure 3. This feature allows easy access to this inner side of the sorting unit 3, at a proper height, for cleaning and maintenance purposes. In alternative embodiment, the access part 3d may be implemented as a hatch, or a removable shell section part.

In an even further embodiment, the sorting unit 2 further comprises one or more sorted item (waste) disposal ports 9, positioned in the predetermined operating space. As shown and indicated in the perspective vie of FIG. 2, the disposal ports 9 may be provided in a in bottom part of the enclosure 3, and at the sides of moving belt 1a during operation, allowing easy picking an item from the moving belt 1a and releasing it above a selected one of the disposal ports 9.

Figure 3A:
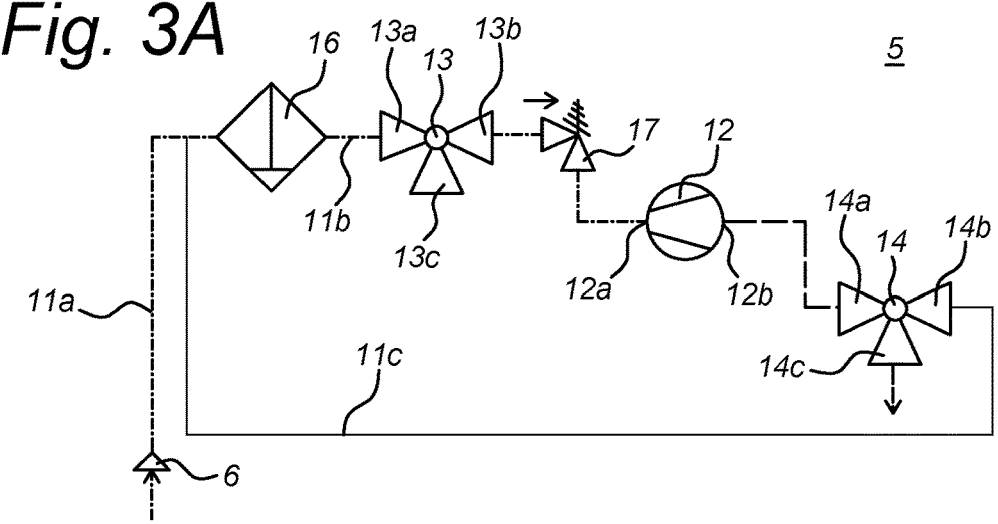
FIGS. 3A and 3B show a schematic diagram of the pneumatic functioning of a suction unit according to a further embodiment of the present invention.
Figure 3B:
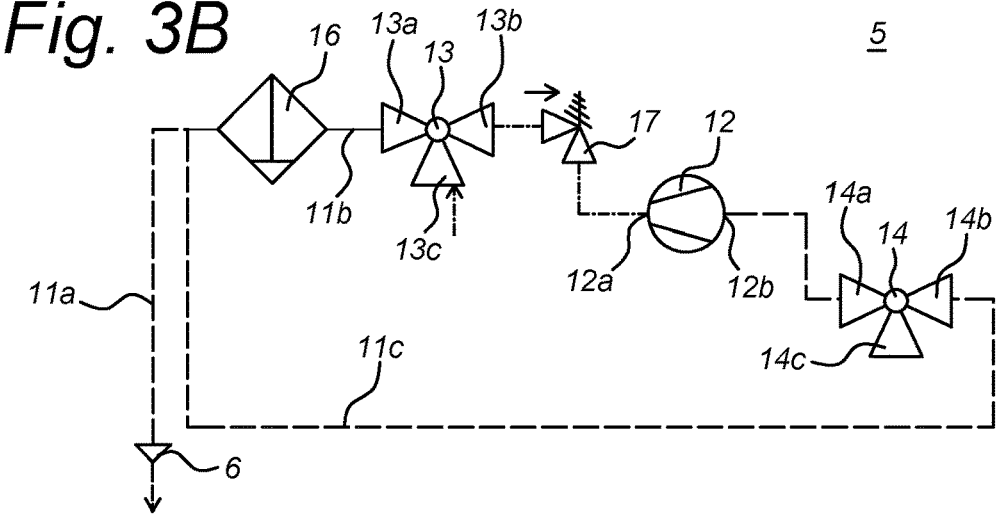

A further aspect of the present invention relates to embodiments of a suction unit 5 as such. The suction unit 5 can be included in a sorting unit 2, e.g. with a robot arm unit 7 suitable to be used in combination with the suction unit 5. FIGS. 3A and 3B show schematic diagrams of the pneumatic functioning of such a suction unit 5. In general, a suction unit 5 is provided for use in a sorting unit 2 according to any one of the embodiments described above, wherein the suction unit 5 comprises a suction head 6 connected to a suction head channel 11 (e.g. in the form of a flexible tube). A low pressure source 12a is connected to the suction head channel 11 via a first (e.g. three-way) valve 13. The first valve 13 comprises an intake port 13c, and as shown in the three-way valve implementation shown in FIGS. 3A and 3B, a first common port 13a and first connection port 13b. A control unit 15 is connected to the first valve 13 (and optionally to the low pressure source 12a) and arranged to actuate the first valve 13 between a suction position and a release position. In the suction position, low pressure is relayed from the low pressure source 12a all the way up to the suction head 6 via the suction head channel 11 (as shown by the bold pneumatic line in FIG. 3A), allowing to pick up items from the moving belt 1a during operation. When switched to the release position (e.g. by actuating the open communication between the first common port 13a and first connection port 13b to an open communication between the first common port 13a and the intake port 13c), the (partial) vacuum is interrupted, resulting in release of the picked up item. In FIG. 3B, the bold pneumatic line is now running from the low pressure source 12a only up to the intake port 13c of the first valve 13.

In the embodiment shown in FIGS. 3A and 3B, the first valve 13 is positioned close to the low pressure source 12a, allowing to keep all components mounted in a top part of the sorting unit 2. Alternatively, the first valve 13 may be positioned more closely to the suction head 6, with an associated benefit of a more quick release of the item from the suction head 6. In even further embodiments, the first valve 13 in combination with the low pressure source 12a are constructed to obtain a travelling wave of air within the suction head channel 11, aiding in releasing a picked up item from the suction head 6.

In a further group of embodiments, the low pressure source 12a comprises a suction side of a (side channel) blower unit 12. A blower unit 12, especially a side channel blower unit 12, allows to obtain a sufficient amount of under pressure in the suction head channel 11 for proper operation of the suction unit 5, and a sufficient amount of air displacement to provide proper operation. In a further embodiment, the low pressure source 12a has a capacity of more than 500 l/min, e.g. more than 700 l/min, e.g. more than 1000 l/min. Such a capacity, in combination with a (sustained) high pressure difference of at least 2000 Pa, e.g. at least 10000 Pa, or even at least 20000 Pa, and proper dimensioning of the suction head 6, allows to efficiently and reliably pick up items from the moving belt 1a during operation. The higher the capacity (and/or the pressure difference) of the blower unit 12, the higher the weight can be of the items to be picked up. In combination with a proper set-up of the vision unit 1b, or additional sensors (for measuring height of items on the moving belt 1a) it would even be possible to pick up bigger (3D) items with the suction head 6. This allows to use the suction unit 5 for various kinds of items without the need to replace the suction head 6 with a special gripper unit (which moreover would require modifications of the robot arm unit 7 to allow proper orientation of the special gripper unit).

In a further group of embodiments (including the one shown in FIGS. 3A and 3B), the suction unit 5 further comprises a high pressure source 12b connected to the suction head channel 11 via a second three-way valve 14. This is e.g. implemented by means of a second common port 14a and a second connection port 14b of the second three-way valve 14 as shown in FIGS. 3A and 3B. The second three-way valve 14 further comprises an exhaust port 14*c*. The control unit 15 is further connected to the second three-way valve 14, and further arranged to actuate the second three-way valve 14 between a blow position and an exhaust position. This allows to more actively and effectively control release of an item from the suction head 6, as the high pressure transferred to the suction head 6 (via suction head channel 11) in the blow position will actively push the item from the suction head 6 in a well predictable manner. This is indicated by the bold dotted pneumatic line in FIG. 3B from the high pressure 12*b* all the way up to the suction head 6. In the alternatively actuated situation, the high pressure source 12*b* is connected to the exhaust port 14*c* of the second three-way valve 14, as indicated in FIG. 3A.

The high pressure source 12*b* comprises a blow side of a (side channel) blower unit 12 in a further embodiment. Note that this may be the same or a different blower unit 12 as for low pressure source 12*a* discussed above. In the embodiment shown in FIGS. 3A and 3B only a single blower unit 12 is applied, resulting in a more compact suction unit 5, which in turn makes the mounting of the suction unit 5 within the sorting unit 2 much easier.

In an even further embodiment, the control unit 15 is arranged to synchronize actuation of the first valve 13 and the second three-way valve 14. By combining the suction position of the first valve 13 to the exhaust position of the second three-way valve 14, and the release position of the first valve 13 to the blow position of the second three-way valve 14, the functioning of the suction head 6 during operation can be efficiently controlled. It is noted, that in combination with the dynamics of the combination of robot arm unit 7 and suction head 6, and the relative positioning of moving belt 1*a* and sorted item disposal ports 9, the control unit 15 may be arranged to already release an item from the suction head 6 a predetermined distance (or time, e.g. 50 ms) before the suction head 6 is actually above the sorted item disposal port 9 (i.e. to sort of toss the item into the disposal port 9). This will increase the number of attainable picks per minute of the suction unit 5.

In order to allow the major part of components of the suction unit 5 to be mounted in the top part of enclosure 3 of the sorting unit 2 (this leaving as much space as possible for the robot arm unit 7 to use as effective moving space of the suction head 6), the suction head 6 is connected to a common channel part 11*a* of the suction head channel 6 which is as long as possible. To that end, the suction head channel 11 comprises a common channel part 11*a*, a low pressure channel part 11*b*, and a high pressure channel part 11*c*. The common channel part 11*a* is connectable to the suction head 6, the low pressure channel part 11*b* is connectable to the first valve 13, and the high pressure channel part 11*c* is connectable to the second three-way valve 14. It is noted that all connections between elements of the suction unit 5 are advantageously implemented as quick connect/disconnect variants, such that the elements can each be replaced when required (using the access part 3*d* of the enclosure 3 as discussed above).

The suction unit 5 can also be used to pick up specific items from the moving belt 1*a* during operation, such as (plastic) foils, light films, etc. With the construction of the suction head 6 (an open end or open end provided with mesh or the like) usually it is not possible to pick up such flexible and deformable items. If, in accordance with a further embodiment, the suction unit 5 further comprises an (in-line) filter unit 16 positioned in the suction head channel 11, the suction unit 5 can be used as well to pick up such items, by transporting them in the suction head channel 11 to the filter unit 16. The filter unit 16 can be arranged to automatically separate the picked up (flexible/foil/film type) items, and dispose them in a separate bin or the like. It is noted that the filter unit 16 is positioned in the low pressure channel part 11*b* in the embodiment shown in FIGS. 3A and 3B. However, it can also be positioned in the common channel part 11*a* in an alternative embodiment.

The suction unit 5 further may comprise a pressure relief valve 17 in an even further embodiment. The pressure relief valve 17 is arranged to protect other components on the suction unit 5, e.g. in case of blockage of the suction head channel 11. It is noted that the pressure relief valve may be positioned at a different location with the pneumatic scheme of FIGS. 3A and 3B, or further pressure relief valves 17 may be positioned at various locations, providing similar or even improved safety.

Above, the present invention has been described with reference to a number of exemplary embodiments, such as the embodiments shown in the drawings. Furthermore, the present invention can be described by the following numbered and interdependent embodiment clauses:

Embodiment 1

A sorting unit (2) for an item sorting system (1), comprising an enclosure (3) having a work aperture (4), a suction unit (5) mounted in the enclosure (3) and having a suction head (6), and a robot arm unit (7) mounted in the enclosure (3) for moving the suction head (6) within a predetermined operating space within the enclosure (3), wherein the enclosure (3) comprises one or more shell sections (3*a*), the one or more shell sections (3*a*) forming a side wall (3*b*) of the enclosure (3).

Embodiment 2

The sorting unit (2) according to embodiment 1, wherein the one or more shell sections (3*a*) are made from plastic material, e.g. polycarbonate.

Embodiment 3

The sorting unit (2) according to embodiment 1 or 2, wherein the suction unit (5) comprises a suction unit mounting structure (5*a*) directly attached to the enclosure (3).

Embodiment 4

The sorting unit (2) according to any one of embodiments 1-3, further comprising a down-flow unit (8) positioned at a top side (3*c*) of the enclosure (3).

Embodiment 5

The sorting unit (2) according to any one of embodiments 1-4, further comprising an access part (3*d*) in the side wall (3*b*) of the enclosure (3).

Embodiment 6

The sorting unit (2) according to any one of embodiments 1-5, further comprising one or more sorted item disposal ports (9), positioned in the predetermined operating space.

Embodiment 7

A suction unit (5) for use in a sorting unit (2) according to any one of embodiments 1-6, wherein the suction unit (5)

comprises a suction head (6) connected to a suction head channel (11), a low pressure source (12*a*) connected to the suction head channel (11) via a first valve (13), the first valve (13) comprising an intake port (13*c*), and a control unit (15) connected to the first valve (13), and arranged to actuate the first valve (13) between a suction position and a release position.

Embodiment 8

The suction unit (5) according to embodiment 7, wherein the low pressure source (12*a*) comprises a suction side of a blower unit (12).

Embodiment 9

The suction unit (5) according to embodiment 7 or 8, wherein the low pressure source (12*a*) has a capacity of more than 500 l/min, e.g. more than 700 l/min, e.g. more than 1000 l/min.

Embodiment 10

The suction unit (5) according to any one of embodiments 7-9, further comprising a high pressure source (12*b*) connected to the suction head channel (11) via a second three-way valve (14), the second three-way valve (14) comprising an exhaust port (14*c*), wherein the control unit (15) is further connected to the second three-way valve (14), and further arranged to actuate the second three-way valve (14) between a blow position and an exhaust position.

Embodiment 11

The suction unit (5) according to embodiment 10, wherein the high pressure source (12*b*) comprises a blow side of a blower unit (12).

Embodiment 12

The suction unit (5) according to embodiment 10 or 11, wherein the control unit (15) is arranged to synchronize actuation of the first valve (13) and the second three-way valve (14).

Embodiment 13

The suction unit (5) according to any one of embodiments 10-12, wherein the suction head channel (11) comprises a common channel part (11*a*), a low pressure channel part (11*b*), and a high pressure channel part (11*c*), the common channel part (11*a*) being connectable to the suction head (6), the low pressure channel part (11*b*) being connectable to the first valve (13), and the high pressure channel part (11*c*) being connectable to the second three-way valve (14).

Embodiment 14

The suction unit (5) according to any one of embodiments 7-13, further comprising an filter unit (16) positioned in the suction head channel (11).

Embodiment 15

The suction unit (5) according to any one of embodiments 7-14, further comprising a pressure relief valve (17).

Embodiment 16

An item sorting system (1), comprising a moving belt (1*a*) and one or more sorting units (2) according to any one of embodiments 1-6, at least one of the one or more sorting units (2) comprising a suction unit (5) according to any one of embodiments 7-15.

Embodiment 17

The item sorting system (1) according to embodiment 16, further comprising a vision unit (1*b*) for providing sorting image data associated with items on the moving belt (1*a*) during operation, the one or more sorting units (2) each comprising a sorting control unit (2*a*) connected to the robot arm unit (7) and the control unit (15) of the associated suction unit (5), the sorting control unit (2*a*) being connected to the vision unit (1*b*) for receiving the sorting image data.

The present invention has been described above with reference to a number of exemplary embodiments as shown in the drawings. Modifications and alternative implementations of some parts or elements are possible, and are included in the scope of protection as defined in the appended claims.

The invention claimed is:

1. A sorting unit for a waste item sorting system, comprising an enclosure having a work aperture, a suction unit mounted in the enclosure and having a suction head, and a robot arm unit mounted in the enclosure for moving the suction head within a predetermined operating space within the enclosure, wherein the enclosure comprises one or more shell sections, the one or more shell sections forming a side wall of the enclosure, and wherein the one or more shell sections are arched shell sections forming a cylindrical side wall of the enclosure.

2. The sorting unit according to claim 1, wherein the one or more shell sections are made from transparent plastic material.

3. The sorting unit according to claim 1, wherein the suction unit comprises a suction unit mounting structure directly attached to the enclosure.

4. The sorting unit according to claim 1, wherein the enclosure comprises a top side and the sorting unit further comprises a down-flow unit positioned at the top side of the enclosure, and wherein the down-flow unit is configured to provide an over pressure in the enclosure.

5. The sorting unit according to claim 1, further comprising an access part in the side wall of the enclosure.

6. The sorting unit according to claim 1, further comprising one or more sorted item disposal ports, positioned in the predetermined operating space.

7. A suction unit for use in a sorting unit according to claim 1, wherein the suction unit comprises
   a suction head connected to a suction head channel,
   a low pressure source connected to the suction head channel via a first valve, the first valve comprising an intake port, and
   a control unit connected to the first valve, and arranged to actuate the first valve between a suction position and a release position,
   wherein the low pressure source has a capacity of more than 700 l/min and is arranged to provide a pressure difference of at least 10,000 Pa.

8. The suction unit according to claim 7, wherein the low pressure source comprises a suction side of a blower unit.

9. The suction unit according to claim 7, further comprising
a high pressure source connected to the suction head channel via a second three-way valve, the second three-way valve comprising an exhaust port,
wherein the control unit is further connected to the second three-way valve, and further arranged to actuate the second three-way valve between a blow position and an exhaust position.

10. The suction unit according to claim 9, wherein the high pressure source comprises a blow side of a blower unit.

11. The suction unit according to claim 9, wherein the control unit is arranged to synchronize actuation of the first valve and the second three-way valve.

12. The suction unit according to claim 9, wherein the suction head channel comprises a common channel part, a low pressure channel part, and a high pressure channel part, the common channel part being connectable to the suction head, the low pressure channel part being connectable to the first valve, and the high pressure channel part being connectable to the second three-way valve.

13. The suction unit according to claim 7, further comprising a filter unit positioned in the suction head channel.

14. The suction unit according to claim 7, further comprising a pressure relief valve.

15. An item sorting system, comprising a moving belt and one or more sorting units according to claim 1, at least one of the one or more sorting units comprising a suction unit according to claim 7.

16. The item sorting system according to claim 15, further comprising a vision unit for providing sorting image data associated with items on the moving belt during operation, the one or more sorting units each comprising a sorting control unit connected to the robot arm unit and the control unit of the associated suction unit, the sorting control unit being connected to the vision unit for receiving the sorting image data.

* * * * *